United States Patent [19]

Pavlin

[11] Patent Number: 5,104,449
[45] Date of Patent: Apr. 14, 1992

[54] WATER-SOLUABLE ROSIN-BASED COATINGS AND INKS

[75] Inventor: Mark S. Pavlin, Lawrenceville, N.J.

[73] Assignee: Union Camp Corporation, Wayne, N.J.

[21] Appl. No.: 743,051

[22] Filed: Aug. 9, 1991

[51] Int. Cl.⁵ ............................................... C09D 11/08
[52] U.S. Cl. ..................................... 106/30; 106/241; 527/602; 525/544
[58] Field of Search ............... 106/30, 241; 527/602; 525/54.4

[56] References Cited

U.S. PATENT DOCUMENTS

| | | | |
|---|---|---|---|
| 4,391,640 | 7/1983 | Okoshi et al. | 106/30 |
| 4,792,356 | 12/1988 | Rudolphy et al. | 106/30 |
| 4,857,624 | 8/1989 | DeBlasi et al. | 106/30 |

FOREIGN PATENT DOCUMENTS 3-124775  5/1991  Japan .

Primary Examiner—William R. Dixon, Jr.
Assistant Examiner—Helene Klemanski
Attorney, Agent, or Firm—William K. Wissing

[57] ABSTRACT

Stable pigmented coating composition, suitable as a package coating varnish or ink, including newsprint ink or rotogravure ink, comprises a suspension of at least 10 weight % pigment in an aqueous solution of at least 5 weight % water soluble modified rosin, the water-soluble modified rosin having an acid number of at least 150 and comprising the reaction product of rosin, formaldehyde and at least one of an ortho- or para-carboxyl-substituted phenol. The weight ratio of pigment to resin is from 5:1 to 1:5.

11 Claims, No Drawings

WATER-SOLUABLE ROSIN-BASED COATINGS AND INKS

BACKGROUND OF THE INVENTION

The present invention is based on the inclusion of a water-soluble modified resin.

This invention pertains to coatings, sometimes referred to as varnishes, and particularly pigmented coatings, or inks, in which the primary binder is a soluble modified rosin resin, and the primary solvent is water.

Modified rosin resins, including particularly fumaric acid- and maleic anhydride-modified rosin resins, are well known, as are phenol-modified rosin resins, all of which are sometimes used as carrier resins in package coatings, usually referred to as varnishes, and inks, including magazine and newsprint inks. However, practical embodiments of such coating compositions have generally all been non-aqueous solvent based. Economics and environmental concerns provide an incentive for the development of aqueous-based resin coatings. Whereas some fumaric acid-modified and maleic anhydride-modified rosin resins work in aqueous coatings, practical phenol-modified rosin compositions for this purpose have been effectively unavailable, due primarily to the absence of a suitable water-soluble modified rosin resin.

Compositions in this general field and including some of these characteristics are disclosed in the prior art U.S. patents identified below, all of which have been considered in conjunction with the preparation of the present patent application, namely:

| | |
|---|---|
| 2,776,895 | Biser, |
| 3,468,829 | Yoshioka et al, |
| 3,674,732 | Pitzalis et al. |
| 3,880,788 | Rudolphy, |
| 4,075,143 | Schelhaas et al. and |
| 4,391,640 | Okoshi et al. |

All of the above references pertain to solvent-based varnishes and inks. In each of these references, a resin is included which is a modified rosin, in some cases a phenol or phenolformaldehyde-modified rosin.

BRIEF DESCRIPTION OF THE INVENTION

A water-based pigmented coating composition, or ink, comprises a stable suspension of at least 10 weight % pigment in an aqueous solution comprising at least 5 weight % of a water-soluble, phenol-modified rosin resin with an acid number of at least 150. The pigment and resin are present in a weight ratio of from 5:1 to 1:5. The modified rosin resin is the reaction product of rosin, formaldehyde, and at least one of an ortho- or para-carboxyl-substituted phenol, preferably para-hydroxybenzoic acid. However, ortho-hydroxybenzoic acid and resorcylic acid may also be used.

The pH of the composition is in the range of 8-10, preferably about 9. Generally, a base, such as an organic amine (triethanolamine, for example) or alkali (such as ammonia or sodium hydroxide) is included for the purpose of obtaining this pH. A co-solvent, such as an alcohol, and other resins, such as acrylic resins or fumaric or maleic modified rosin resins may also be included, the proportions and particular constituents varying depending on the intended use of the composition. Other composition constituents may include surfactants, defoamers, and wax.

DETAILED DESCRIPTION OF THE INVENTION

A phenol-modified rosin resin is produced by including, as at least part of the phenolic component of a phenol-formaldehyde condensate in the reactant mixture, at least one of an ortho- or a para-carboxyl-substituted phenol, such as a hydroxybenzoic acid, preferably para-hydroxybenzoic acid. Ortho-hydroxybenzoic acid, (salicylic acid) and resorcylic acid may also be used. The resin contains at least 1 weight percent of the ortho- or para-carboxyl-substituted phenol. For use in water-soluble coatings and inks of the present invention the phenol-modified rosin resin contains at least 50 weight percent rosin and from about 10-25 weight percent hydroxybenzoic acid. This resin, made under reaction conditions similar to those heretofore used for making other phenolformaldehyde-rosin resins, can be produced with relatively high acid number and is therefore highly soluble in water, particularly in aqueous solutions with a pH on the order of 8-10.

An aqueous solution of this modified rosin resin, generally including at least 5% weight resin, forms an excellent water-based coating composition, from which a variety of water based inks can be made. Newsprint, flexographic and gravure inks may be made from such compositions, by the formation of stable suspensions of pigments therein.

Pigmentation of such Coating solutions, for use as inks, may be readily accomplished in a conventional manner by ball milling essentially any pigment conventionally used for aqueous inks and incorporating the appropriate proportions thereof into the coating solution. In general, the pigment is incorporated in a weight ratio (to resin) range of from about 1:5 to 5:1, the lower end of this range (1:5, pigment to resin) being more suitable for gravure ink and the higher end being more suitable for newsprint ink. In the final ink product, the pigment comprises 10-25 weight %.

By way of example, a stable, fluid coating composition or varnish was formed in accordance with this invention by preparing a solution comprising:
25 parts resin
5.5 parts ammonium hydroxide
5 parts isopropanol
64.5 parts water.

The pH of this solution was 9.5 and its viscosity was 3100 cps.

Red and blue inks were prepared from this varnish, using pigments available from Sun Chemical, namely phthalocyanine blue (#249-0535) and barium lithol red (#210-4592). These inks, formulated with a pigment to resin ratio of 1.0, comprised about 30 weight % solids.

The inks prepared in this manner were fluid and had good appearance when drawn down on paper substrates. The resin used in the foregoing formulation was prepared by reaction of 600 grams of tall oil rosin, 120 grams phenol (para-hydroxybenzoic acid), 91.5 grams paraformaldehyde, and 3 grams magnesium oxide as basic catalyst. This composition was reacted for about 16 hours prior to dehydration up to about 200° C. It had an acid number of 158 and a capillary melting point of 145° C.

As illustrated by the foregoing coating composition and particularly the capillary melting point of the resin used therein, resins of this invention have a somewhat higher softening point than other comparable resins and thus lend themselves to the production of coating compositions and inks which should be quite useful in heat applications, where thermal sensitivity of the resin would be a disadvantage.

Even more importantly, these useful coating compositions, and particularly the inks exemplified, would be most useful because they are water based, rather than conventional non-aqueous solvent-based solutions.

While this invention has been described with reference to specific embodiments, it is not limited thereto. The appended claims are intended to be construed to encompass not only those forms and variants specifically described and referred to, but to such other forms and embodiments of the invention as may be devised by those skilled in the art without departing from the true spirit and scope thereof.

What is claimed:

1. Stable, pigmented coating composition comprising: at least about 10 weight % pigment; and an aqueous solution of at least 5 weight % water-soluble, phenol-modified rosin resin, said phenol-modified rosin resin containing at least 50 weight % rosin and at least 1 weight % of an ortho- or para-carboxyl-substituted phenol, and having an acid number of at least 150, and consisting of the reaction product of said rosin, formaldehyde and said ortho- or para-carboxyl-substituted phenol.

2. A coating composition, as recited in claim 1, further including other resins.

3. A coating composition, as recited in claim 1, wherein said ortho- or para-carboxyl-substituted phenol is selected from the group consisting of para-hydroxybenzoic acid, ortho-hydroxybenzoic acid and resorcylic acid.

4. A coating composition, as recited in claim 1, wherein said ortho- or para-carboxyl-substituted phenol is para-hydroxybenzoic acid.

5. A coating composition, as recited in claim 4, wherein the weight ratio of pigment to modified rosin resin is from 5:1 to 1:5.

6. A coating composition, as recited in claim 5, further including a base.

7. A coating composition, as recited in claim 6, wherein said base is selected from the group consisting of organic amines, sodium hydroxide, potassium hydroxide and ammonia.

8. A coating composition, as recited in claim 7, having a pH of 8-10.

9. A coating composition, as recited in claim 8, having a pH of 9.

10. A coating composition, as recited in claim 9, further including at least one additional resin.

11. A coating composition, as recited in claim 10, wherein said additional resin is selected from the group consisting of fumaric acid-modified rosin resins, maleic anhydride-modified rosin resins and acrylic resins.

* * * * *